United States Patent
Yamada et al.

(10) Patent No.: US 7,177,078 B2
(45) Date of Patent: Feb. 13, 2007

(54) PROJECTION TYPE DISPLAY APPARATUS

(75) Inventors: Ryuuji Yamada, Tokyo (JP); Hiroshi Gouda, Tokyo (JP); Katsuyuki Takeuchi, Tokyo (JP)

(73) Assignees: Kyocera Corporation, Kyoto (JP); NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 11/268,782

(22) Filed: Nov. 7, 2005

(65) Prior Publication Data

US 2006/0114557 A1    Jun. 1, 2006

(30) Foreign Application Priority Data

Nov. 29, 2004    (JP)    .............. 2004-344866

(51) Int. Cl.
G02B 23/24    (2006.01)
G02B 3/00    (2006.01)
G02B 27/10    (2006.01)

(52) U.S. Cl. .............. 359/434; 359/619; 359/649

(58) Field of Classification Search ........ 359/434–435, 359/618–637, 649–651, 676, 362; 353/31–84; 355/53–98

See application file for complete search history.

(56) References Cited

U.S. PATENT DOCUMENTS 5,867,319 A * 2/1999 Sugiyama et al. .......... 359/618

7,066,602 B2 * 6/2006 Lee et al. .............. 353/31

FOREIGN PATENT DOCUMENTS

| JP | 07-161601 | 6/1995 |
|---|---|---|
| JP | 2000-187178 | * 7/2000 |
| JP | 2000-321529 | * 11/2000 |

* cited by examiner

*Primary Examiner*—Thong Q Nguyen
(74) *Attorney, Agent, or Firm*—Hogan & Hartson LLP

(57) ABSTRACT

A projection type display apparatus, wherein a common case can be used for housing an illumination optical system even when a shape of an image display element and an optical path length in a prism are different, is provided: wherein a light source for emitting an illumination light, an image display device, an illumination optical system for irradiating the illumination light from the light source to the image display device, and a projection optical system for projecting an image formed by said image display device are provided; the illumination optical system comprises a first fly-eye lens and a second fly-eye lens arranged at each other's focal points, a first lens group and a second lens group arranged over a mirror for bending an optical path; the first and second lens groups have a same focal length but a different back focus; and predetermined condition formulas are satisfied.

6 Claims, 13 Drawing Sheets

STATE 1 IN FIRST EMBODIMENT

STATE 2 IN FIRST EMBODIMENT

STATE 1 IN SECOND EMBODIMENT

STATE2 IN SECOND EMBODIMENT

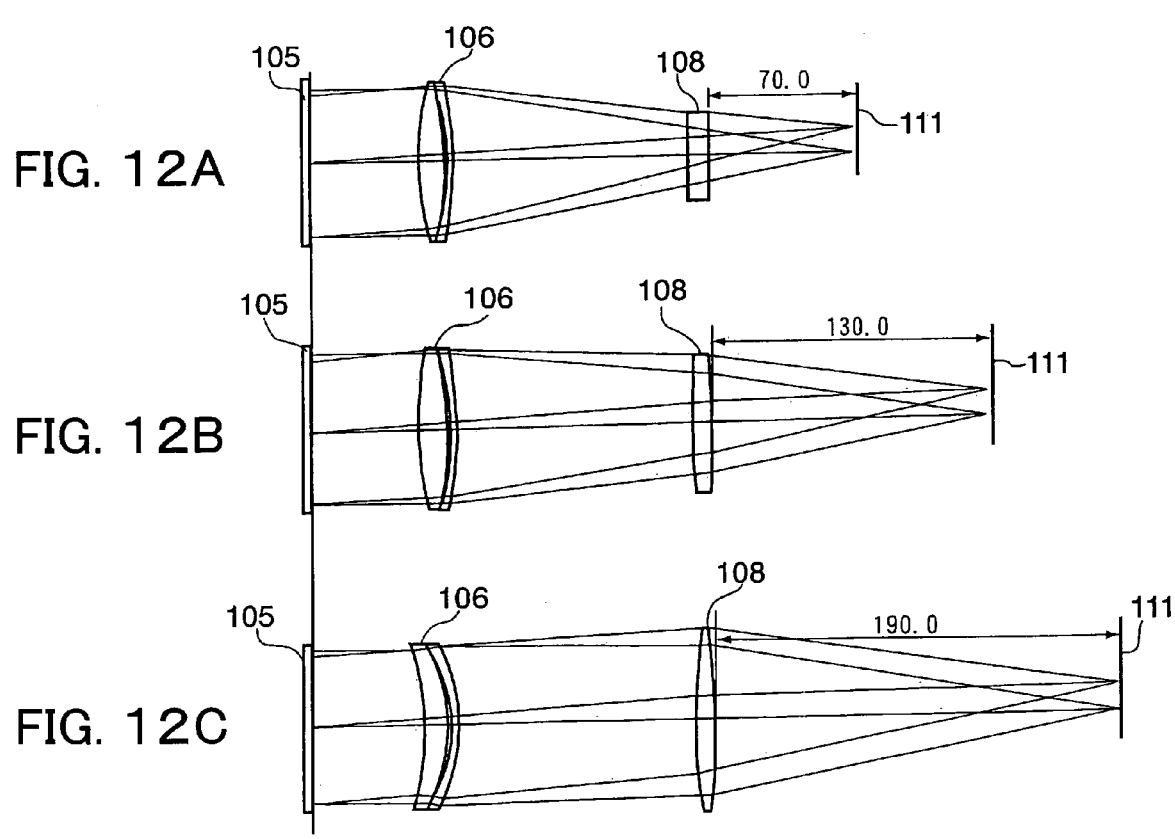

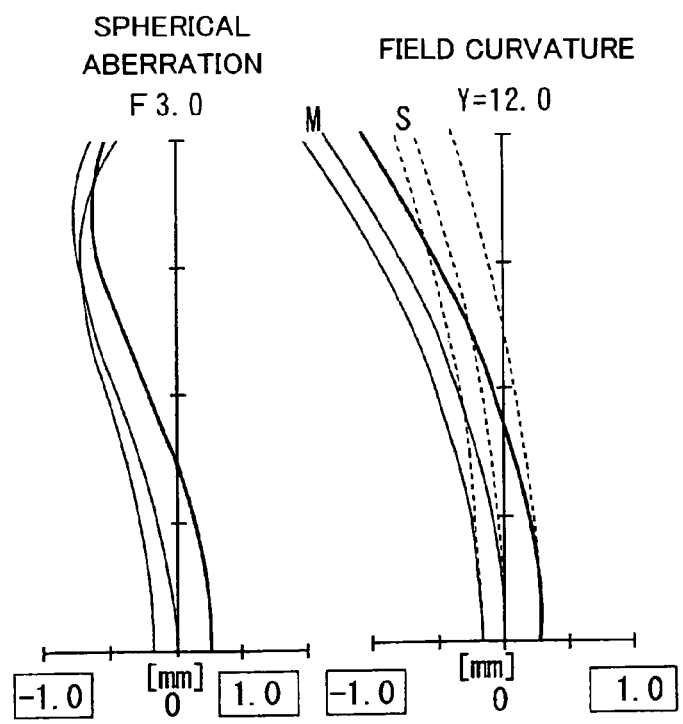
FIG. 13A SPHERICAL ABERRATION F 3.0
FIG. 13B FIELD CURVATURE Y=12.0
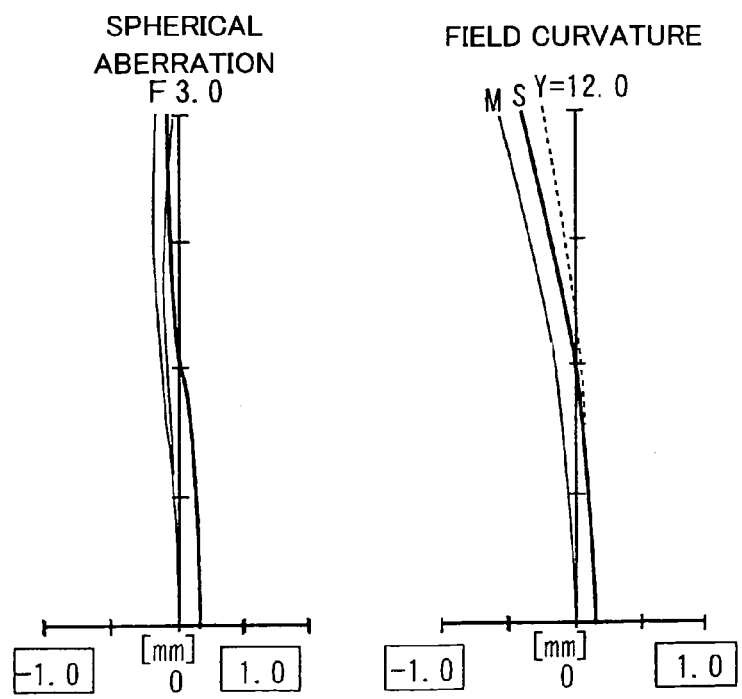
FIG. 14A SPHERICAL ABERRATION F 3.0
FIG. 14B FIELD CURVATURE Y=12.0

SPHERICAL ABERRATION

F 3.0

FIELD CURVATURE

Y=12.0

PROJECTION TYPE DISPLAY APPARATUS

BACKGROUND OF THE INVENTION

1. Field of the Invention

The present invention relates to an illumination optical apparatus including a fly-eye lens and a projection type display apparatus using the same.

2. Description of the Related Art

For example, an illumination optical apparatus used in a projection type display apparatus (projector), etc. provided with a liquid crystal display device is configured to include a pair of fly-eye lenses.

In an illumination optical apparatus including a pair of fly-eye lenses, the pair of fly-eye lenses uniformize a light intensity distribution of an illumination light from a light source and irradiate to an illumination surface of, for example, a liquid crystal display panel as a spatial light modulation device, etc.

As an illumination optical apparatus of this kind, for example, an apparatus including a mirror for changing a direction of an illumination light has been proposed. (for example, refer to the Japanese Unexamined Patent Publication No. 7-161601).

There are a variety of sizes of image display devices in projection type display apparatuses using a reflection type display device, and TIR prisms and color separation/composition prisms having a variety of optical path lengths are used in accordance with a size of the image display device.

In this case, arrangements of optical elements are different, so that a case of an illumination optical apparatus has been individually developed when developing an illumination optical system in accordance with a change of the image display device and prism. Therefore, investments on the molds became enormous to be a burden on the development costs.

To solve the problem, there is known a method of designing a projection type display device as explained below.

The method is, in a projection type image display apparatus having a light source, image display device, illumination optical system, projection lens, and optical unit structure: the optical unit structure is provided with one kind selected from two kinds of image display devices having a different display size at the same aspect ratio while keeping a predetermined distance from the light source to the image display device to be approximately equal; and the illumination optical system is provided with at least one of a plurality of optical elements at a predetermined position, so that an illumination region by the illumination optical system on the image display device matches approximately with a display size of the image display in accordance with the provided image display device.

A case of the illumination optical system is used in common in this designing method by keeping the distance from the light source to the image display device and using an image display device having a different size but the same aspect ratio.

As a result, an illumination optical system and projection optical system corresponding respectively to image devices having different display area sizes can be formed by using a common optical unit structure.

According to the designing method of a projection type display apparatus explained above, however, in the case of an illumination optical system of, for example, three-plate digital micro mirror device (DMD), when using a DMD having a different screen aspect ratio and different screen size, optical path lengths and sizes of the color separation/composition prism and TIR prism are different, so that the illumination optical system case cannot be used in common.

SUMMARY OF THE INVENTION

It is desired to provide a projection type display apparatus, wherein a common case can be used for housing an illumination optical system even when a shape of the image display device and an optical path length in the prism are different.

To respond to the above demand, according to the present invention, there is provided a projection type display apparatus comprising a light source for emitting an illumination light, an image display device, an illumination optical system for irradiating the illumination light from the light source to the image display device, and a projection optical system for projecting an image formed by the image display device; wherein the illumination optical system comprises a first fly-eye lens and a second fly-eye lens arranged at each other's focal points, a first lens group, and a second lens group arranged over a mirror for bending an optical path and having a same focal length as that of the first lens group but a different back focus; and it is possible to change from a predetermined first state to a second state satisfying condition formulas below.

$$e1 = -(\varnothing - \varnothing 11 - \varnothing 12)/(\varnothing 11 \times \varnothing 12) \quad (1)$$

$$e2 = -(\varnothing - \varnothing 21 - \varnothing 22)/(\varnothing 21 \times \varnothing 22) \quad (2)$$

$$\varnothing 11 = (1 - fb1 \times \varnothing)/e1 \quad (3)$$

$$\varnothing 21 = (1 - fb2 \times \varnothing)/e2 \quad (4)$$

$$0.95 < e1/e2 < 1.05 \quad (5)$$

$$1.1 \times (1 - e1 \times \varnothing)/\varnothing < fb < f \times 0.9 \quad (6)$$

Here, $\varnothing$ indicates a refracting power of an entire relay lens system (inverse number of focal length f), $\varnothing 11$ indicates a refracting power of a first lens group in the first state, $\varnothing 12$ indicates a refracting power of the second lens group in the first state, $\varnothing 21$ indicates a refracting power of the first lens group in the second state, $\varnothing 22$ indicates a refracting power of the second lens group in the second state, e1 indicates a paraxial inter-group distance between the first lens group and the second lens group in the first state, e2 indicates a paraxial inter-group distance between the first lens group and the second lens group in the second state, fb1 indicates a paraxial back-focus of the relay lens system receiving an infinite light flux in the first state and fb2 indicates a paraxial back focus of the relay lens system against an infinite light flux in the second state, respectively.

Preferably, the first fly-eye lens, the second fly-eye lens, the first lens group, the mirror and the second lens group are arranged in this order from the light source side along an optical path of the illumination light.

Preferably, in the first and second states, the first fly-eye lens, the second fly-eye lens, an incident surface of the first lens group, and the mirror are arranged in this order from the light source side on one optical axis being free of the influence of reflecting effects; and a distance d1 from the mirror to the light incident surface of the second lens group in the first state and a distance d2 from the mirror to the light incident surface of the second lens group in the second state are set to be approximately equal.

Preferably, a prism is arranged on the illumination light emitting side of the second lens group.

Preferably, a case for housing the illumination optical system is provided; and the illumination optical system is arranged in a predetermined length direction of the case, and the illumination optical system in the first state and the illumination optical system in the second state are exchangeable.

Preferably, the first lens group and the second lens group form a relay lens system; and focal lengths of the first and second fly-eye lenses and the relay lens system are maintained to be constant.

According to the present invention, a common case can be used for housing an illumination optical system even when a shape of the image display device and an optical path length in the prism are different.

BRIEF DESCRIPTION OF DRAWINGS

These and other objects and features of the present invention will become clearer from the following description of the preferred embodiments given with reference to the attached drawings, in which:

FIG. 12A to FIG. 12C are views of an optical path when changing a back-focus while keeping an arrangement constant at a focal length of 200 mm;

FIG. 13A and FIG. 13B are views of an aberration of a relay lens system corresponding to the configuration in FIG. 12A;

FIG. 14A and FIG. 14B are views of an aberration of a relay lens system corresponding to the configuration in FIG. 12B.

DESCRIPTION OF THE PREFERRED EMBODIMENT

Below, embodiments of the present invention will be explained with reference to the attached drawings.

First Embodiment

Figures 1A, 1B:
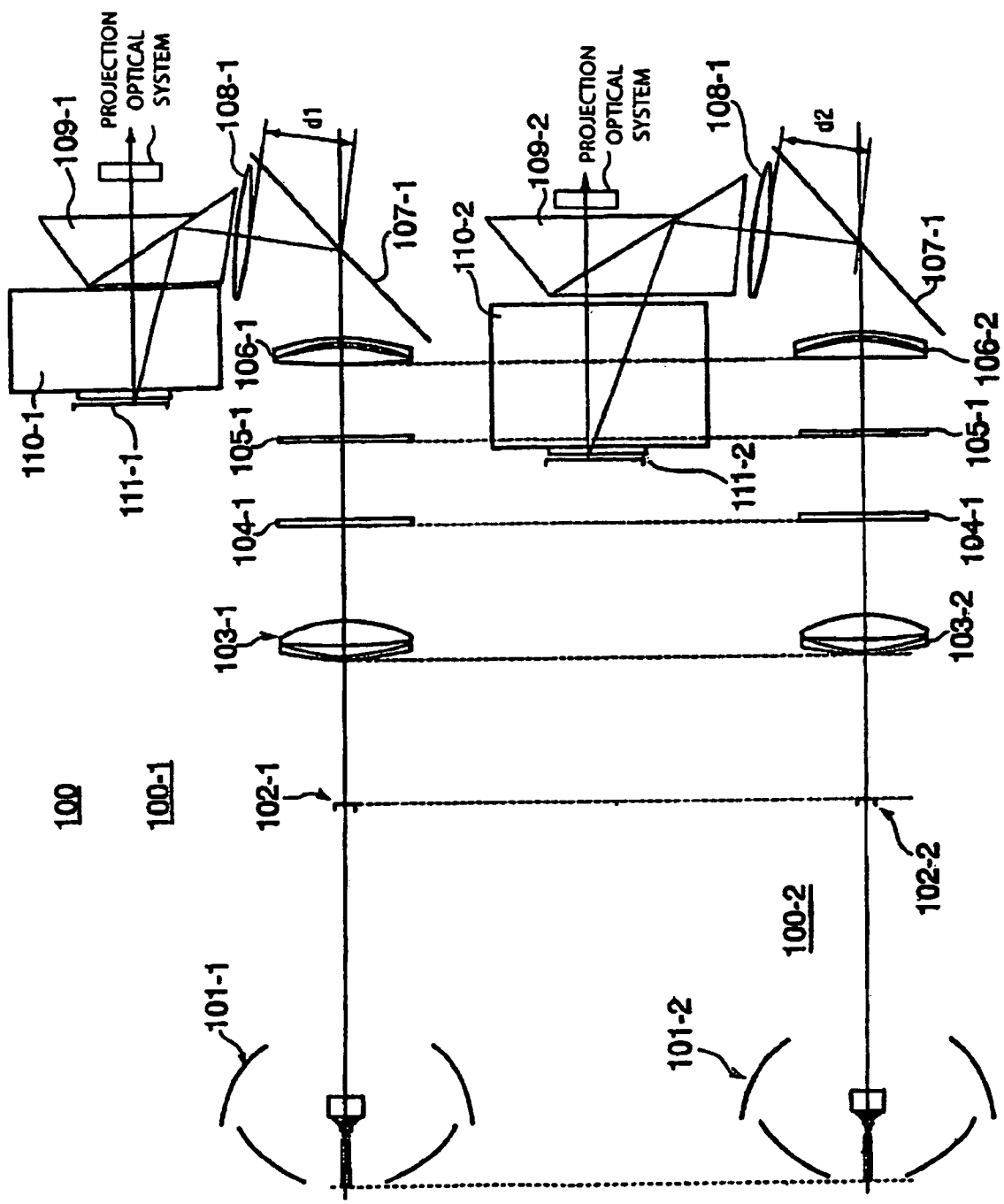
FIG. 1A and FIG. 1B are views of an optical system showing the configuration in a first state and that in a second state of a projection type display apparatus according to a first embodiment of the present invention.

FIG. 1A and FIG. 1B are views of an optical system showing the configuration in a first state and that in a second state of a projection type display apparatus according to a first embodiment of the present invention: wherein FIG. 1A shows the configuration in the first state and FIG. 1B shows the configuration in the second state.

Note that the unit is "mm" in a distance, length and interval, etc. in the present embodiment.

A projection type display device 100 of the present embodiment basically includes a light source 101, aperture 102, collimeter lens 103, first fly-eye lens 104, second fly-eye lens 105, first relay lens group (also referred to as a first lens group) 106, turning-back mirror 107, second relay lens group (also referred to as a second lens group) 108, TIR prism 109, color separation/composition prism 110 and reflection type image display device 111.

A projection type display apparatus 100-1 in the first state of the present embodiment has a light source 101-1, aperture 102-1, collimeter lens 103-1, first fly-eye lens 104-1, second fly-eye lens 105-1, first relay lens group (also referred to as a first lens group) 106-1, turning-back mirror 107-1, second relay lens group (also referred to as a second lens group) 108-1, TIR prism 109-1, color separation/composition prism 110-1 and reflection type image display device 111-1.

Similarly, a projection type display apparatus 100-2 in the second state of the present embodiment has a light source 101-2, aperture 102-2, collimeter lens 103-2, first fly-eye lens 104-2, second fly-eye lens 105-2, first relay lens group (also referred to as a first lens group) 106-2, turning-back mirror 107-2, second relay lens group (also referred to as a second lens group) 108-2, TIR prism 109-2, color separation/composition prism 110-2 and reflection type image display device 111-2.

In the projection type display apparatus 100-1 in the first state and that 100-2 in the second state of the present embodiment, the first fly-eye lens 104 (-1 and -2) and the second fly-eye lens 105 (-1 and -2) are arranged at each other's focal points.

Also, in the projection type display apparatus 100-1 in the first state and that 100-2 in the second state of the present embodiment, the first relay lens group 106 (-1 and -2) and the second relay lens group 108 (-1 and -2) are arranged over the mirror 107 (-1 and -2) for bending an optical path.

In the projection type display apparatus of the present embodiment, the first fly-eye lens and the second fly-eye lens are arranged at each other's focal points, and a relay lens systems having the same focal length but different back focus are arranged in the same way as explained above, so that a case of the lens can be used in common even when a shape of the image display device or an optical path length in the prism is different.

Specifically, to accept prisms having different optical path lengths, each of first and second relay lens groups having the same focal length but different back-focus is configured to satisfy the condition formulas below.

[Formula 1]

$$e1 = -(\varnothing - \varnothing 11 - \varnothing 12)/(\varnothing 11 \times \varnothing 12) \quad (1)$$

$$e2 = -(\varnothing - \varnothing 21 - \varnothing 22)/(\varnothing 21 \times \varnothing 22) \quad (2)$$

$$\varnothing 11 = (1 - fb1 \times \varnothing)/e1 \quad (3)$$

$$\varnothing 21 = (1 - fb2 \times \varnothing)/e2 \quad (4)$$

$$0.95 < e1/e2 < 1.05 \quad (5)$$

$$1.1 \times (1 - e1 \times \varnothing)/\varnothing < fb < fx 0.9 \quad (6)$$

Here, $\varnothing$ indicates a refracting power of the entire relay lens system (inverse number of focal length), $\varnothing 11$ indicates a refracting power of a first lens group in the first state, $\varnothing 12$ indicates a refracting power of the second lens group in the first state, $\varnothing 21$ indicates a refracting power of the first lens group in the second state, $\varnothing 22$ indicates a refracting power of the second lens group in the second state, e1 indicates a paraxial inter-group distance between the first lens group and the second lens group in the first state, e2 indicates a paraxial inter-group distance between the first lens group and the second lens group in the second state, fb1 indicates a paraxial back focus of the relay lens system against an infinite light flux in the first state and fb2 indicates a paraxial back focus of the relay lens system against an infinite light flux in the second state, respectively.

As a result, the predetermined first state can be changed to be the second state satisfying the condition formulas.

By satisfying the above conditions, an optical system, wherein optical elements can be arranged in a common case even when a shape of each optical element is changed, can be provided in the projection type display apparatus of the present embodiment.

The above condition formulas (1) to (5) express paraxial relationship of the first lens group and the second lens group when two different relay lens systems have the same focal length but different back-focus.

The formulas (1) to (4) are general paraxial formulas and the formula (5) expresses a condition, under which a distance between the first lens group and the second lens group does not change largely between the first state and the second state and a common case can be used.

As a result, only a back-focus can be changed in a state of maintaining the focal length, so that it is possible to accept a change of the optical path length of the prism.

The formula (6) is a condition, under which refracting powers of the first lens group and the second lens group can be suitably distributed and preferable focusing performance as a relay lens system can be obtained.

When a back-focus becomes less than the lower limit of the formula (6), a refracting power of the second lens group becomes weak and the refracting power leans to the first group, which is not preferable in terms of aberration correction. While, when the back-focus excesses the upper limit, a refracting power of the first lens group becomes weak and the refracting power leans to the second lens group, which is not preferable, either.

When changing a size of the image display device, to keep the arrangement of fly-eye lenses to be constant, it is necessary that the two fly-eye lenses satisfy the condition of having the same shape, being made by the same material, arranged approximately at each other's focal points, and only a shape of the cell is changed along with the change of the image display device.

An illumination region of the illumination optical system is formed as a result that a shape of a lens cell aperture of the first fly-eye lens is enlarged to be projected on the image display device by the second fly-eye lens and the relay lens system. Since the magnification power is determined by a ratio of a focal length of the second fly-eye lens to a focal length of the relay lens system, by keeping the focal lengths of the fly-eye lens and the relay lens system to be constant, the magnification power can be kept constant. By keeping the magnification power constant, it becomes possible to respond to a change of a size of the image display device only by changing a shape of the aperture of the fly-eye lens cell.

By keeping the focal length of the relay lens system constant, the mutual arrangement can be always constant regardless of a shape of the image display device and a back-focus of the relay lens system.

As explained above, when two fly-eye lenses are arranged at each other's focal points and a power arrangement of the relay lens groups satisfies the condition formulas (1) to (6), it becomes possible for a common case to accept a change of a size of the image display device and an optical path length of the prism.

Below, the specific configuration and function of each part in FIG. 1, an evaluation based on specific values of the condition formulas and consideration thereon will be explained in order.

Note that, in FIG. 1A and FIG. 1B, the image display devices 111-1 and 111-2 are reflection type image display elements, such as a DMD, wherein the image display ranges are different. Also, the TIR prisms 109-1 and 109-2 and the color separation composition prisms 110-1 and 110-2 have different optical path lengths.

The light sources 101-1 and 101-2 are configured to include, for example, a halogen lamp or a metal halide lamp and a rotary oval reflector and irradiate a white illumination light.

The apertures 102-1 and 102-2 have a rectangular aperture and block an unnecessary light flux in an illumination light from the light source 101. While not illustrated, a converged light from the rotary oval reflector of the light source 101 irradiates the aperture 102.

The collimeter lens 103 (-1 and -2) converts the converged light irradiated to the aperture 102 to a parallel light flux to be irradiated to the first fly-eye lens 104.

Note that the configuration including the rotary oval reflector, aperture 102 and collimeter lens 103 can be also configured by a light source of the rotary paraboloidal reflector.

The first fly-eye lenses 104-1 and 104-2 and the second fly-eye lenses 105-1 and 105-2 have the same focal length due to being formed by the same material, having the same thickness and lens cell surface shape, and maintain the same positional relationship in the first state and in the second state due to being arranged at each other's focal points.

Furthermore, as a result that the lens cell aperture shape is made to have an approximately homologous shape of the image display device shape, it is possible to accept an image display device having a different size.

The first lens group 106 (-1 and -2) and the second lens group 108 (-1 and -2) respectively form a relay lens system, and the first lens group 106 (-1 and -2) and the second lens group 108 (-1 and -2) are arranged over the mirror 107 (-1 and -2), respectively.

Focal lengths of the entire relay lens in the first state and in the second state are equal, but the back-focuses are different to be in accordance with an optical path length of each prism.

Dotted lines in FIG. 1 indicate that the respective optical elements are arranged in the same way in the first state and in the second state.

As shown in FIG. 1, the first fly-eye lens 104 (-1 and -2), the second fly-eye lens 105 (-1 and -2), an incident surface of the first lens group 106 (-1 and -2) of the relay lens system and the mirror 107 (-1 and -2) are arranged in this order from the side of the collimeter lens 103 (-1 and -2) on an identical optical axis being free of the influence of reflecting effects.

Also, by making an interval (distance) d1 from the mirror 107-1 to the light incident surface of the second relay lens group 108-1 in the first state equal to an interval (distance) d2 from the mirror 108-2 to the light incident surface of the second relay lens group 108-2 in the second state (d1≈d2), it is possible to use a common case.

Furthermore, by using a lamp having the same light converging angle, the aperture 102 and the collimeter lens 103 can be also arrange in the same way as in FIG. 1.

Table 1 below shows an example of specific values of parameters in the condition formulas (1) to (6) explained above in the paraxial arrangement of the first embodiment. This example satisfies the condition formulas.

TABLE 1

PARAXIAL ARRANGEMENT

|  | $1/\phi$ | $1/\phi_1$ | e | $1/\phi_2$ | fb |
|---|---|---|---|---|---|
| STATE 1 | 162.0 | 265.07 | 109.77 | 244.21 | 94.93 |
| STATE 2 | 162.0 | 482.1 | 105.29 | 190.71 | 126.62 | e1/e2 = 1.04,
Fbmax = 162 × 0.9 = 145.8,
Fbmin1 = 57.45,
Fbmin2 = 62.38

As shown in Table 1, the parameters in the first state (state 1) are set as below.

An inverse $(1/\emptyset)$ of a refracting power $\emptyset$ of the entire relay system is set to 162.0, an inverse $(1/\emptyset 11)$ of a reflective power of the first lens group 106-1 is set to 265.7, a paraxial inter-group distance e1 of the first lens group 106-1 and the second lens group 108-1 is set to 109.77, an inverse $(1/\emptyset 12)$ of a refracting power of the second lens group 108-1 is set to 244.21, and a paraxial back-focus fb1 of the relay lens system receiving an infinite light flux is set to 94.93, respectively.

Similarly, parameters in the second state (state 2) are set as below.

An inverse $(1/\emptyset)$ of a refracting power $\emptyset$ of the entire relay system is set to 162.0, an inverse $(1/\emptyset 21)$ of a reflective power of the first lens group 106-2 is set to 482.1, a paraxial inter-group distance e2 of the first lens group 106-2 and the second lens group 108-2 is set to 105.29, an inverse $(1/\emptyset 22)$ of a refracting power of the second lens group 108-2 is set to 190.71, and a paraxial back-focus fb2 of the relay lens system receiving an infinite light flux is set to 126.62, respectively.

In the projection type display apparatus 100 in the first embodiment, wherein the parameters are set as shown in Table 1, "e1/e2" is 1.04, which is in a range regulated by the condition formula (5), so that the condition is satisfied.

Also, the maximum value Fbmax of the back-focus fb is 145.8 (162×0.9), the minimum value Fbmin1 of the back-focus in the first state is 57.45 and the minimum value Fbmin2 of the back-focus in the second state is 62.38, which are in the range regulated by the condition formula (6), so that the condition is satisfied.

Figure 2A:
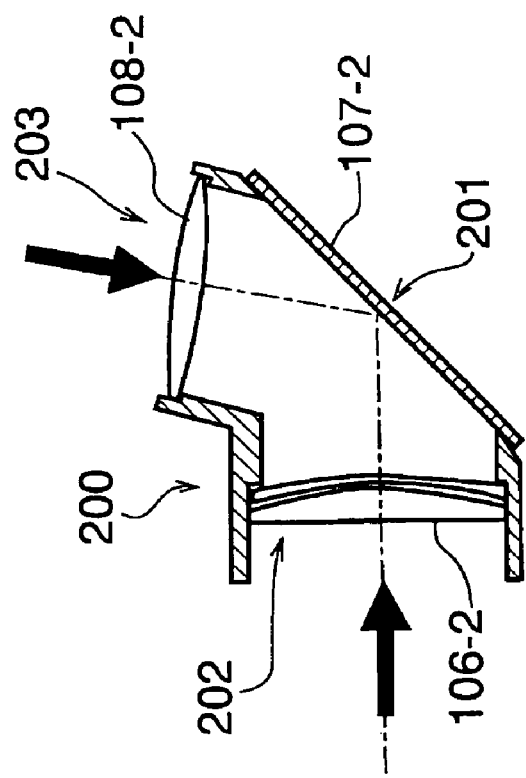
FIG. 2A and FIG. 2B are views of the configuration of a holding member of a relay lens system according to the first embodiment.
Figure 2B:
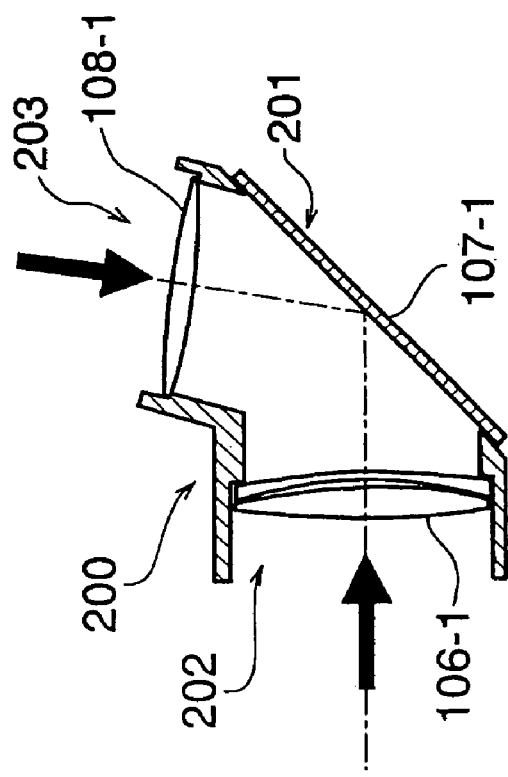

FIG. 2A and FIG. 2B are views of the configuration of a holding member of a relay lens system according to the first embodiment, wherein a section of the cylinder is shown. FIG. 2A corresponds to the first state and FIG. 2B corresponds to the second state.

The holding member 200 is formed to be a cylindrical shape bent at a predetermined angle, wherein a bent portion 201 attached with the mirror 107 is cut at a predetermined angle.

It is configured that the mirror 107 is arranged between the first relay lens group 106 and the second relay lens group 108, and the first relay lens group 106 is installed from the fly-eye lens side and the second relay lens group 108 is installed from the TIR prism side, respectively.

Specifically, the first relay lens group 106 is installed in an opening 202 of one end side (fly-eye lens side) and the second relay lens group 108 is installed in an opening 203 on the other end side (TIR prism side) of the bent holding member 200.

Due to the configuration, in the projection type display apparatus 100 according to the first embodiment, a distance from a top of an emission surface of the first relay lens group 106 to a top of an incident surface of the second relay lens group 108 is in common, consequently, the relay lens can be installed by using a common case.

A slight error arises in the height from the lens holding surface to the top of the surface due to a difference of curvature, however, it can be corrected by a simple spacer. Alternately, it is also possible to design to omit the spacer in consideration of a height of the lens surface.

Figure 3A:
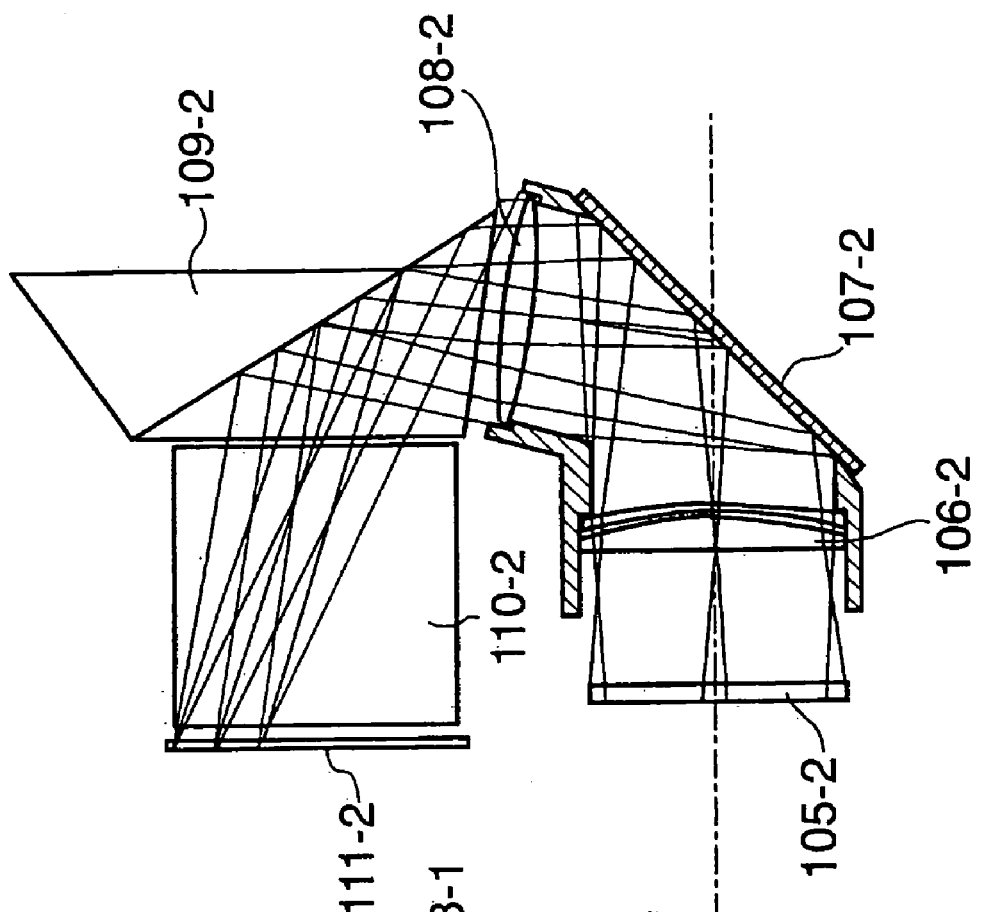
FIG. 3A and FIG. 3B are views of an optical path of the relay lens system in the first state and in the second state in the first embodiment.
Figure 3B:
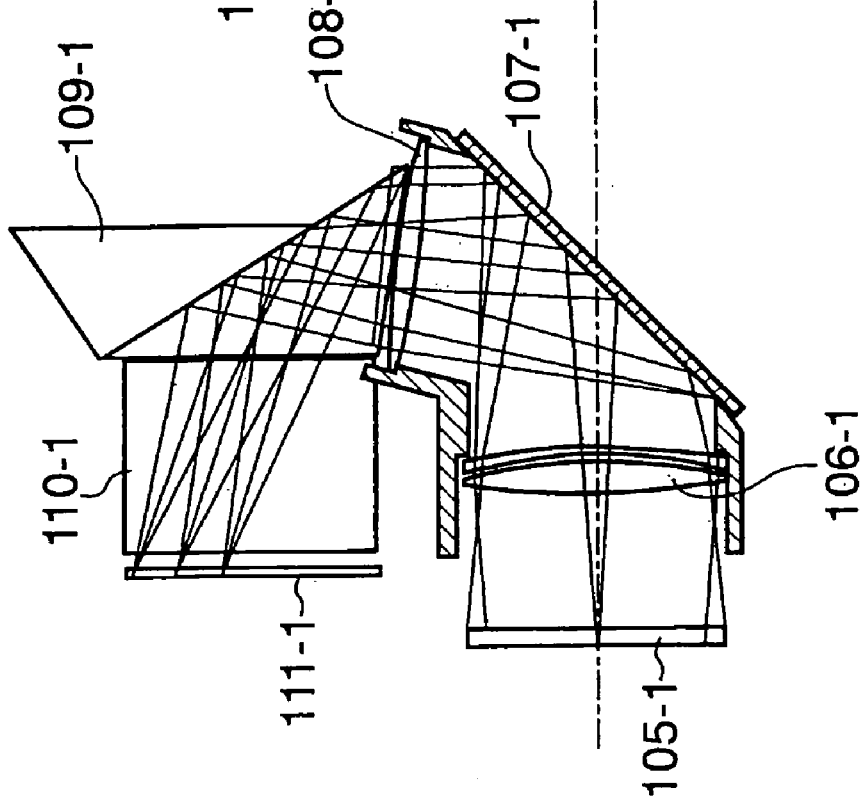

FIG. 3A and FIG. 3B are views of an optical path of a relay lens system in the first state and in the second state of the first embodiment.

As is known from the drawings, in the projection type display apparatus 100 of the first embodiment, a parallel light is focused on the image display devices 111-1 and 111-2.

Figure 4A:
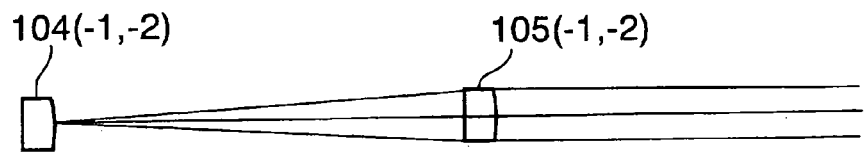
FIG. 4A and FIG. 4B are views of a state of a light flux when a first fly-eye lens is placed at a focal position of a second fly-eye lens.
Figure 4B:
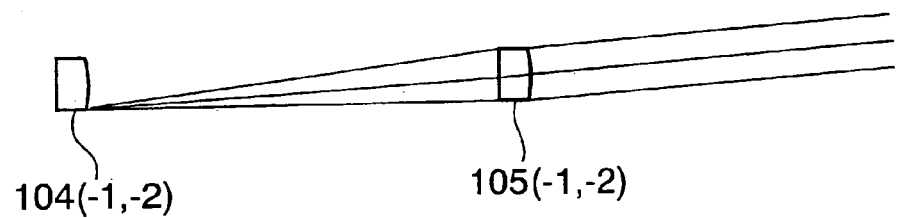

FIG. 4A and FIG. 4B are views showing a state of a light flux when the first fly-eye lens is arranged on a focal point of the second fly-eye lens.

As is known from the drawings, in the projection type display apparatus 100 of the first embodiment, the light flux emitted from the surface of the first fly-eye lens becomes parallel as a result that the first fly-eye lenses 104-1 and 104-2 are arranged on the focal points of the second fly-eye lenses 105-1 and 105-2.

Figure 5A:
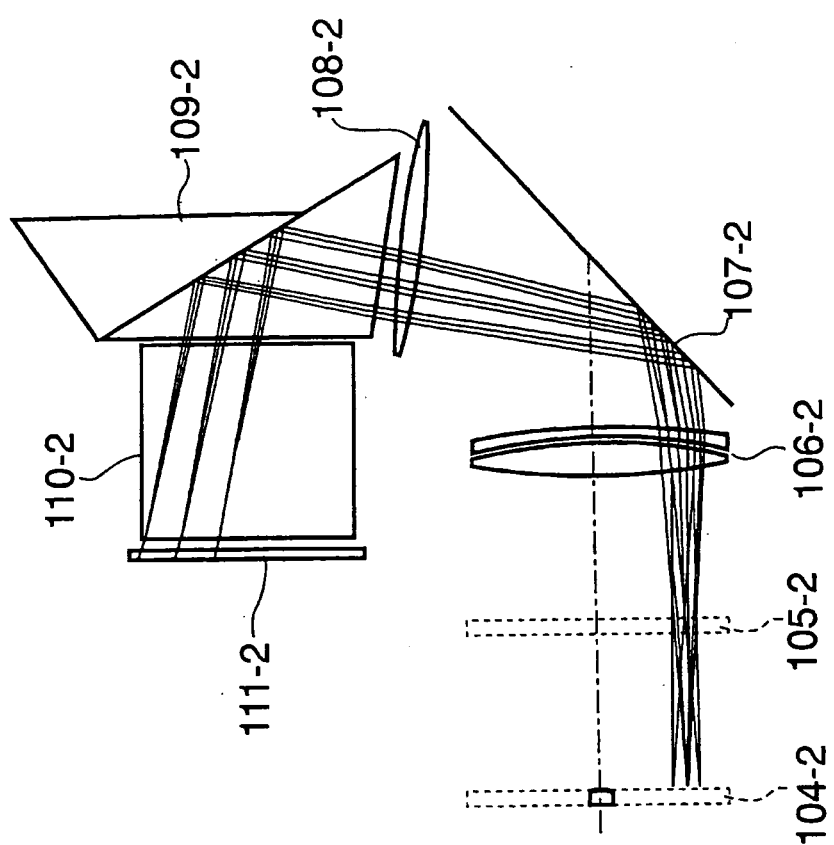
FIG. 5A and FIG. 5B are views of putting FIG. 3A and FIG. 3B together with FIG. 4A and FIG. 4B.
Figure 5B:
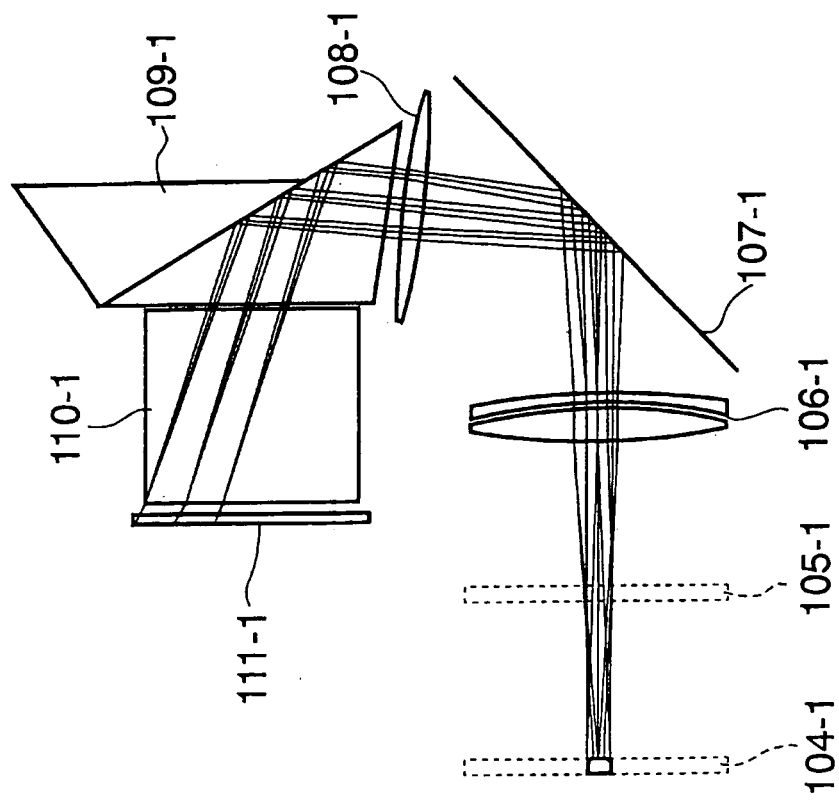

FIG. 5A and FIG. 5B are views, wherein FIG. 3A and FIG. 3B are put together with FIG. 4A and FIG. 4B and a state that a surface of the first fly-eye lens is focused on the image display devices 111-1 and 111-2 by the second fly-eye lens and the relay lens is shown by focusing on the lens cell at the center and the peripheral lens cells.

Figure 6:
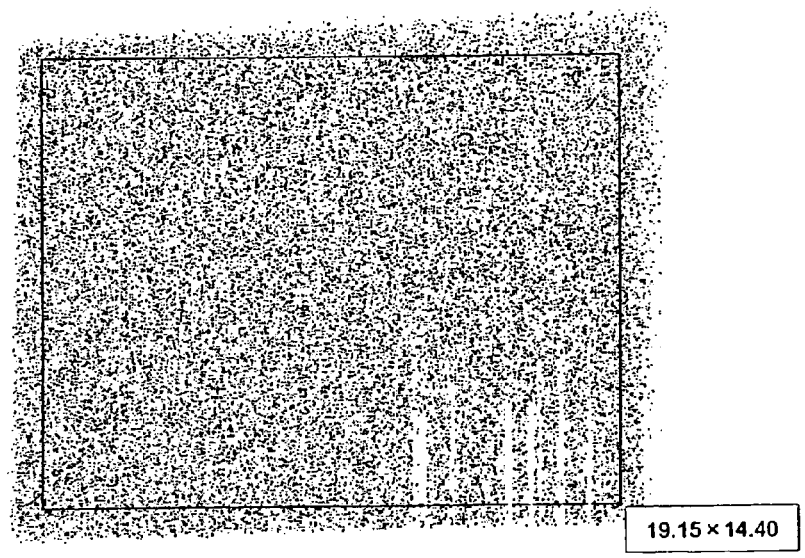
FIG. 6 is a view of an illumination state of an image display device in an optical path in the first state of the first embodiment.

FIG. 6 is a view of an illumination state of an image display device in an optical path in the first state of the first embodiment.

Figure 7:
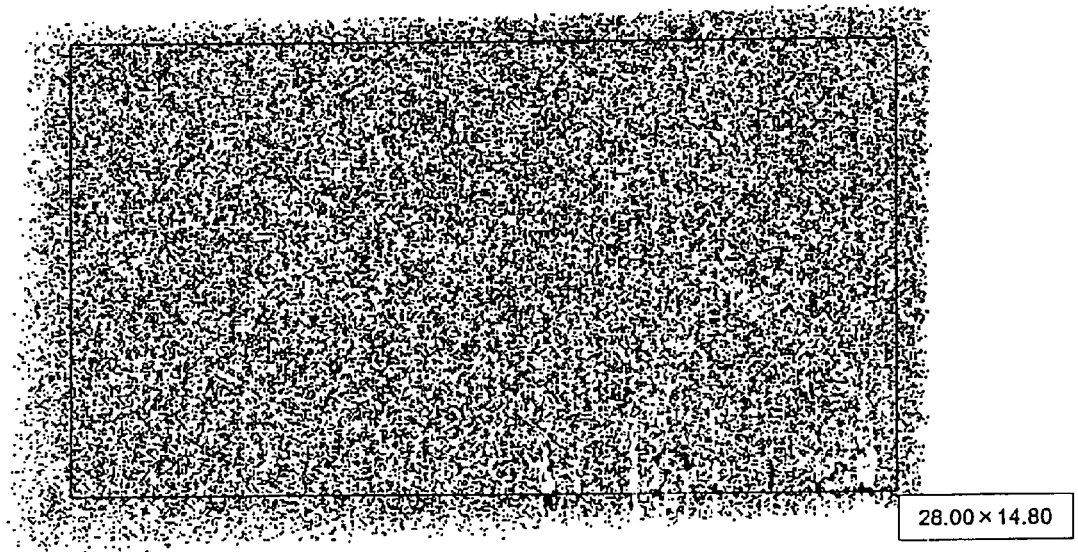
FIG. 7 is a view of an illumination state of an image display device in an optical path in the second state of the first embodiment.

FIG. 7 is a view of an illumination state of an image display device in an optical path in the second state of the first embodiment.

From FIG. 6 and FIG. 7, in the projection type display apparatus 100 of the first embodiment, it is known that image display devices having different sizes are accurately illuminated by using the common case.

Table 2 shows optical data in the first state in the first embodiment and Table 3 shows optical data in the second state in the same way.

As shown in Table 2 and Table 3, the projection type display apparatus 100 of the first embodiment accepts image display devices having different sizes as a result of having the same fly-eye lens arrangement and changing a size of the lens cell.

TABLE 2

| SURFACE | R | INTERVAL | REFRACTION INDEX | DISPERSION | INCLINATION | EFFECTIVE DIAMETER | |
|---|---|---|---|---|---|---|---|
| 1 | ∞ | 83.60 | | | | 10.0 × 18.2 | |
| 2 | 135.34 | 2.00 | 1.60311 | 60.7 | | φ70 | |
| 3 | 85.61 | 5.80 | | | | φ70 | |
| 4 | 205.25 | 15.00 | 1.63854 | 55.4 | | φ70 | |
| 5 | −68.49 | 30.00 | | | | φ70 | |
| 6 | ∞ | 3.50 | 1.472 | 65.65 | | 70.5 × 68.2 | |
| 7 | −23.3 | 46.0 | | | | 4.7 × 6.2 | FLY-EYE CELL SIZE |
| 8 | ∞ | 3.50 | 1.472 | 65.65 | | 70.5 × 68.2 | |
| 9 | −23.3 | 40.00 | | | | 4.7 × 6.2 | FLY-EYE CELL SIZE |
| 10 | 200.00 | 10.00 | 1.51633 | 64.1 | | φ70 | |
| 11 | −137.40 | 2.00 | | | | φ70 | |
| 12 | −120.00 | 2.00 | 1.80518 | 25.4 | | φ70 | |
| 13 | −195.00 | 51.00 | | | | φ70 | |
| 14 | ∞ | 49.00 | REFLECTION SURFACE | | 48.625 | | |
| 15 | 252.00 | 6.00 | 1.51633 | 64.1 | | φ70 | |
| 16 | −252.00 | 4.00 | | | | φ70 | |
| 17 | ∞ | 27.84 | 1.51633 | 64.1 | | | |
| 18 | ∞ | 35.46 | REFLECTION SURFACE | | 49.75 | | |
| 19 | ∞ | 1.00 | | | 16.75 | | |
| 20 | ∞ | 57.00 | 1.51633 | 64.1 | | | |
| 21 | ∞ | 4.00 | | | | | |
| 22 | ∞ | 3.00 | 1.51633 | 64.1 | | | |
| 23 | ∞ | 0.50 | | | | 19.15 × 14.36 | IMAGE DISPLAY DEVICE |

TABLE 3

| SURFACE | R | INTERVAL | REFRACTION INDEX | DISPERSION | INCLINATION | EFFECTIVE DIAMETER | |
|---|---|---|---|---|---|---|---|
| 1 | ∞ | 83.60 | | | | 10.0 × 18.2 | |
| 2 | 135.34 | 2.00 | 1.60311 | 60.7 | | φ70 | |
| 3 | 85.61 | 5.80 | | | | φ70 | |
| 4 | 205.25 | 15.00 | 1.63854 | 55.4 | | φ70 | |
| 5 | −68.49 | 30.00 | | | | φ70 | |
| 6 | ∞ | 3.50 | 1.472 | 65.65 | | 72 × 71.2 | |
| 7 | −23.3 | 46.0 | | | | 4.8 × 8.9 | FLY-EYE SURFACE |
| 8 | ∞ | 3.50 | 1.472 | 65.65 | | 72 × 71.2 | |
| 9 | −23.3 | 40.00 | | | | 4.8 × 8.9 | FLY-EYE SURFACE |
| 10 | ∞ | 10.00 | 1.51633 | 64.1 | | φ70 | |
| 11 | −99.12 | 2.00 | | | | φ70 | |
| 12 | −88.00 | 2.00 | 1.80518 | 25.4 | | φ70 | |
| 13 | −135.00 | 51.00 | | | | φ70 | |
| 14 | ∞ | 49.00 | REFLECTION SURFACE | | 48.625 | | |
| 15 | 174.60 | 8.00 | 1.51633 | 64.1 | | φ70 | |
| 16 | −224.00 | 6.30 | | | | φ70 | |
| 17 | ∞ | 35.2 | 1.51633 | 64.1 | | | |
| 18 | ∞ | 46.2 | REFLECTION SURFACE | | 49.75 | | |
| 19 | ∞ | 1.00 | | | 16.75 | | |
| 20 | ∞ | 82.50 | 1.51633 | 64.1 | | | |
| 21 | ∞ | 4.00 | | | | | |
| 22 | ∞ | 3.00 | 1.51633 | 64.1 | | | |
| 23 | ∞ | 0.50 | | | | 28.02 × 14.77 | IMAGE DISPLAY DEVICE |

Second Embodiment

Figure 8:
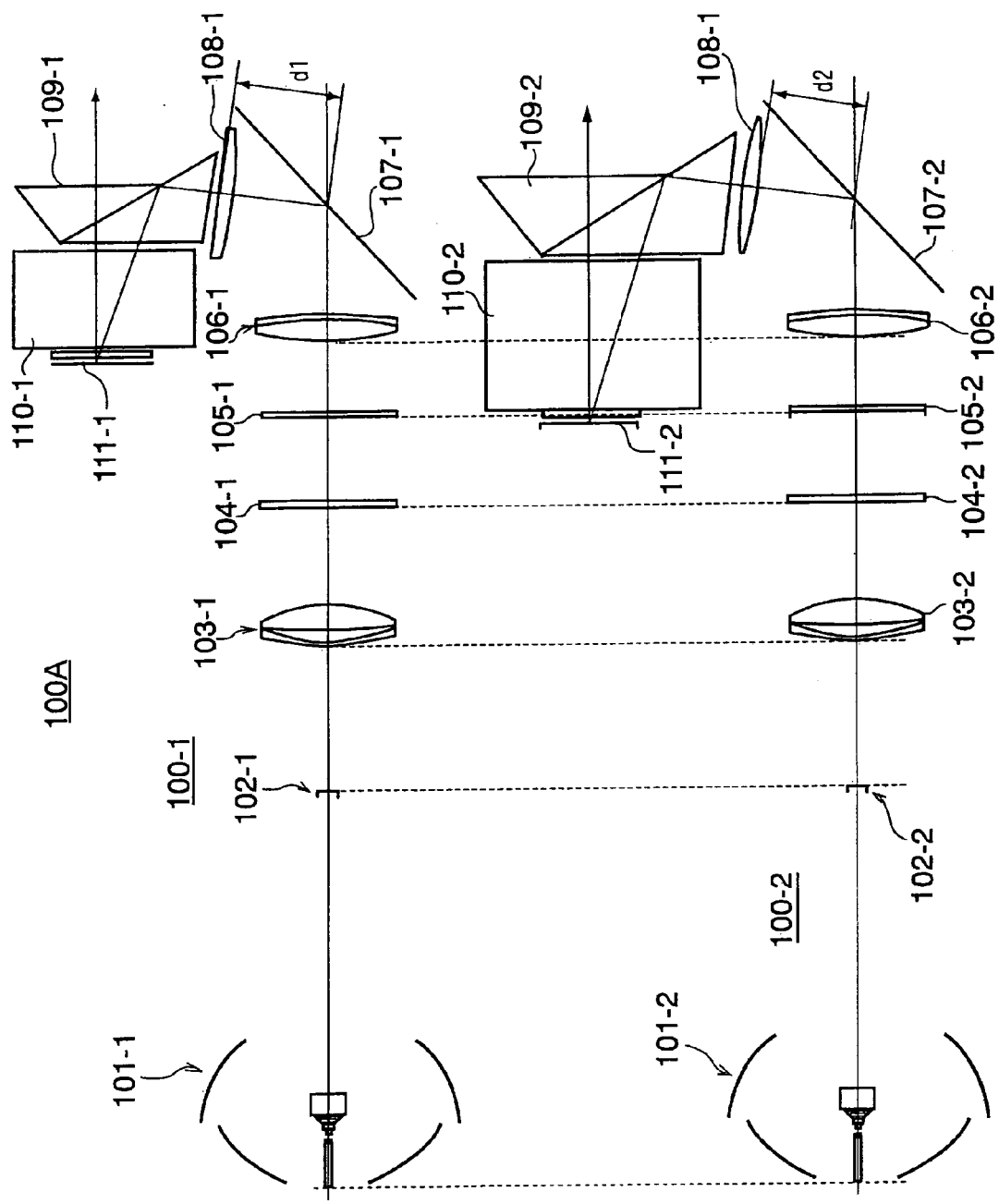
FIG. 8A and FIG. 8B are views of an optical system showing the configuration in the first state and that in the second state of a projection type display apparatus according to a second embodiment of the present invention.

FIG. 8A and FIG. 8B are views of an optical system showing the configuration in a first state and that in a second state of a projection type display apparatus according to a second embodiment of the present invention; wherein FIG. 8A shows the configuration in the first state, and FIG. 8B-shows the configuration in the second state, respectively.

The projection type display apparatus 100A of the second embodiment basically has the same configuration as that of the projection type display apparatus 100 in the first embodiment.

The projection type display apparatus 100A of the second embodiment differs from that of the first embodiment in a focal length of the relay lens and a distance between lens groups. The second embodiment shows that the case can be used in common when the condition formulas (1) to (6) explained above are satisfied.

Table 4 below shows an example of specific values of parameters in the condition formulas (1) to (6) of a paraxial arrangement of the second embodiment. This example satisfies the condition formulas.

TABLE 4

|  | 1/φ | 1/φ1 | e | 1/φ2 | fb |
|---|---|---|---|---|---|
| STATE 1 | 200.0 | 234.23 | 117.67 | 682.40 | 93.0 |
| STATE 2 | 200.0 | 342.47 | 120.58 | 311.37 | 126.6 | e1/e2 = 0.976
Fbmax = 200 × 0.9 = 180
Fbmin1 = 90.56,
Fbmin2 = 87.36

As shown in Table 4, the parameters in the first state (state 1) are set as below.

An inverse (1/∅) of a refracting power ∅ of the entire relay system is set to 200.0, an inverse (1/∅11) of a reflective power of the first lens group 106-1 is set to 234.23, a paraxial inter-group distance e1 of the first lens group 106-1 and the second lens group 108-1 is set to 117.67, an inverse (1/∅12) of a refracting power of the second lens group 108-1 is set to 682.40, and a paraxial back-focus fb1 of the relay lens system receiving an infinite light flux is set to 93.00, respectively.

Similarly, parameters in the second state (state 2) are set as below.

An inverse (1/∅) of a refracting power ∅ of the entire relay system is set to 200.0, an inverse (1/∅21) of a reflective power of the first lens group 106-2 is set to 342.47, a paraxial inter-group distance e2 of the first lens group 106-2 and the second lens group 108-2 is set to 120.58, an inverse (1/∅22) of a refracting power of the second lens group 108-2 is set to 311.37, and a paraxial back-focus fb2 of the relay lens system receiving an infinite light flux is set to 126.6, respectively.

In the projection type display apparatus 100A in the second embodiment, wherein the parameters are set as in Table 4, "e1/e2" is 0.976, which is in a range regulated by the condition formula (5), so that the condition is satisfied.

Also, the maximum value Fbmax of the back-focus fb is 180 (200×0.9), the minimum value Fbmin1 of the back-focus in the first state is 90.56 and the minimum value Fbmin2 of the back-focus in the second state is 87.36, which are in the range regulated by the condition formula (6), so that the condition is satisfied.

Table 5 shows optical data in the first state of the second embodiment, and Table 6 shows optical data in the second state in the same way.

As shown in Table 5 and Table 6, the projection type display apparatus 100A of the second embodiment accepts image display devices having different sizes as a result of having the same fly-eye lens arrangement and changing a size of the lens cell.

TABLE 5

| SURFACE | R | INTERVAL | REFRACTION INDEX | DISPERSION | INCLINATION | EFFECTIVE DIAMETER |
|---|---|---|---|---|---|---|
| 1 | ∞ | 83.60 | | | | 10.0 × 18.2 |
| 2 | 135.34 | 2.00 | 1.60311 | 60.7 | | φ70 |
| 3 | 85.61 | 5.80 | | | | φ70 |
| 4 | 205.25 | 15.00 | 1.63854 | 55.4 | | φ70 |
| 5 | −68.49 | 30.00 | | | | φ70 |
| 6 | ∞ | 3.50 | 1.472 | 65.65 | | 68.4 × 70.0 |
| 7 | −23.3 | 46.0 | | | | 3.8 × 5.0 |
| 8 | ∞ | 3.50 | 1.472 | 65.65 | | 68.4 × 70.0 |
| 9 | −23.3 | 40.00 | | | | 3.8 × 5.0 |
| 10 | 141.50 | 12.40 | 1.51633 | 64.1 | | φ74 |
| 11 | −152.00 | 0.80 | | | | φ74 |
| 12 | −139.20 | 2.50 | 1.80518 | 25.4 | | φ74 |
| 13 | −267.00 | 61.00 | | | | φ74 |
| 14 | ∞ | 49.00 | REFLECTION SURFACE | | 48.625 | |
| 15 | 290.00 | 7.40 | 1.51633 | 64.1 | | φ62 |
| 16 | 1600.00 | 4.00 | | | | φ62 |
| 17 | ∞ | 27.84 | 1.51633 | 64.1 | | |
| 18 | ∞ | 35.46 | REFLECTION SURFACE | | 49.75 | |
| 19 | ∞ | 1.00 | | | 16.75 | |
| 20 | ∞ | 57.00 | 1.51633 | 64.1 | | |
| 21 | ∞ | 4.00 | | | | |
| 22 | ∞ | 3.00 | 1.51633 | 64.1 | | |
| 23 | ∞ | 0.50 | | | | 19.15 × 14.36 |

TABLE 6

| SURFACE | R | INTERVAL | REFRACTION INDEX | DISPERSION | INCLINATION | EFFECTIVE DIAMETER |
|---|---|---|---|---|---|---|
| 1 | ∞ | 83.60 | | | | 10.0 × 18.2 |
| 2 | 135.34 | 2.00 | 1.60311 | 60.7 | | φ70 |
| 3 | 85.61 | 5.80 | | | | φ70 |
| 4 | 205.25 | 15.00 | 1.63854 | 55.4 | | φ70 |
| 5 | −68.49 | 30.00 | | | | φ70 |
| 6 | ∞ | 3.50 | 1.472 | 65.65 | | 71 × 70.2 |
| 7 | −23.3 | 46.0 | | | | 7.1 × 3.9 |
| 8 | ∞ | 3.50 | 1.472 | 65.65 | | 71 × 70.2 |
| 9 | −23.3 | 40.00 | | | | 7.1 × 3.9 |
| 10 | 215.00 | 12.40 | 1.51633 | 64.1 | | φ70 |

TABLE 6-continued

| SURFACE | R | INTERVAL | REFRACTION INDEX | DISPERSION | INCLINATION | EFFECTIVE DIAMETER |
|---|---|---|---|---|---|---|
| 11 | −164.60 | 0.80 | | | | φ70 |
| 12 | −147.70 | 2.50 | 1.80518 | 25.4 | | φ70 |
| 13 | −284.00 | 61.00 | | | | φ70 |
| 14 | ∞ | 49.00 | REFLECTION SURFACE | | 48.625 | |
| 15 | 300.00 | 7.40 | 1.51633 | 64.1 | | φ70 |
| 16 | −346.00 | 6.30 | | | | φ70 |
| 17 | ∞ | 35.2 | 1.51633 | 64.1 | | |
| 18 | ∞ | 46.2 | REFLECTION SURFACE | | 49.75 | |
| 19 | ∞ | 1.00 | | | 16.75 | |
| 20 | ∞ | 82.50 | 1.51633 | 64.1 | | |
| 21 | ∞ | 4.00 | | | | |
| 22 | ∞ | 3.00 | 1.51633 | 64.1 | | |
| 23 | ∞ | 0.50 | | | | 28.02 × 14.77 |

Figure 9:
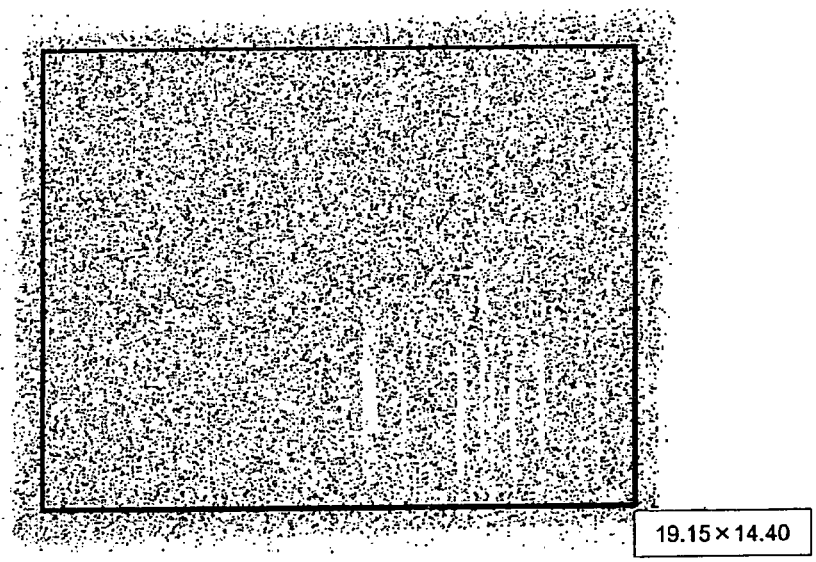
FIG. 9 is a view of an illumination state of an image display device in an optical path in the first state of the second embodiment.

FIG. 9 is a view of an illumination state of an image display device in an optical path in the first state of the second embodiment.

Figure 10:
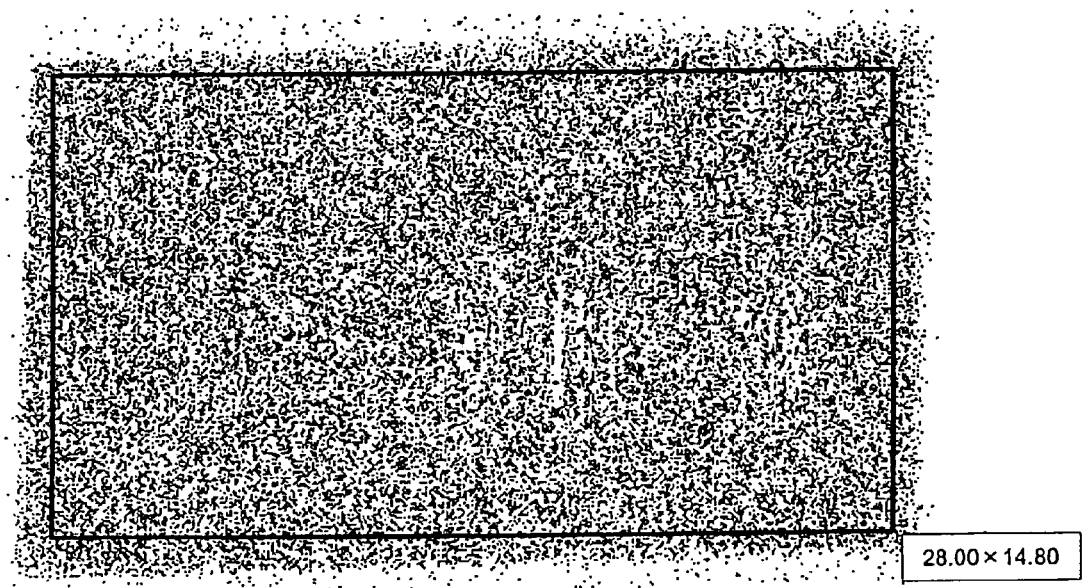
FIG. 10 is a view of an illumination state of an image display device in an optical path in the second state of the second embodiment.

FIG. 10 is a view of an illumination state of an image display device in an optical path in the second state of the second embodiment.

From FIG. 9 and FIG. 10, it is known that ranges of image display devices having different sizes are illuminated (accurately by using a same case) in the projection type display apparatus 100A of the second embodiment.

Third Embodiment

Figures 11A, 11B:
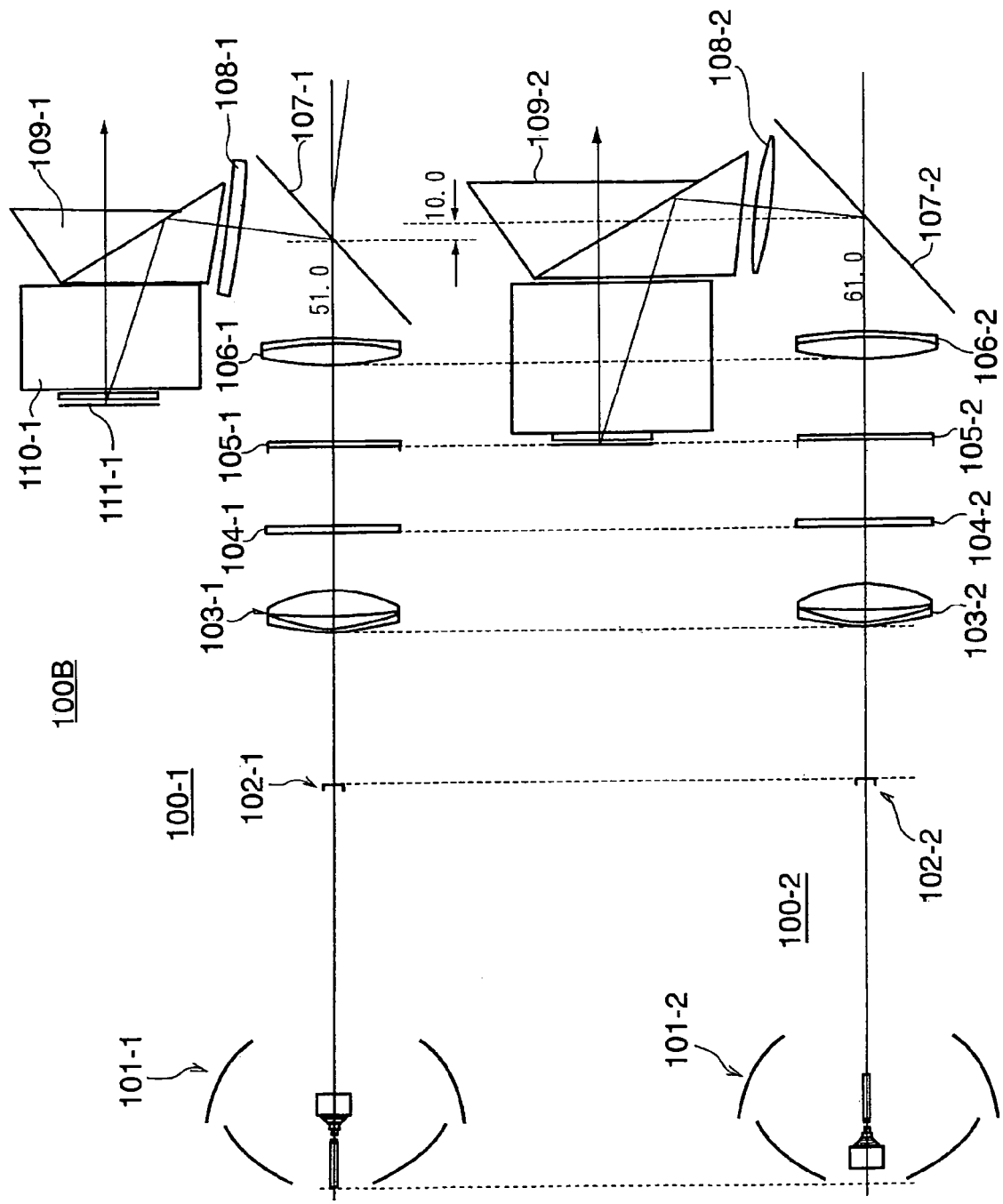
FIG. 11A and FIG. 11B are views of an optical system showing the configuration in the first state and that in the second state of a projection type display apparatus according to a third embodiment of the present invention.

FIG. 11 A and FIG. 11B are views of an optical system showing the configuration in a first state and that in a second state of a projection type display apparatus according to a third embodiment of the present invention; wherein FIG. 11A shows the configuration in the first state and FIG. 11B shows the configuration in the second state, respectively.

The projection type display apparatus 100B of the third embodiment basically has the same configuration as those of the projection type display apparatuses 100 and 100A in the first embodiment and the second embodiment.

A point that the projection type display apparatus 100B of the third embodiment is different from those in the first and second embodiments is that the condition formula (5) as explained above is not satisfied and a common case cannot be used, and it is a comparative example of the first and second embodiments.

Table 7 below shows an example of specific values of parameters in the condition formulas (1) to (6) of a paraxial arrangement of the third embodiment. This is an example of not satisfying the condition formulas.

TABLE 7

| | 1/φ | 1/φ1 | e | 1/φ2 | fb |
|---|---|---|---|---|---|
| STATE 1 | 200.0 | 215.17 | 103.18 | 1469.93 | 93.0 |
| STATE 2 | 200.0 | 342.47 | 120.58 | 311.37 | 126.6 | e1/e2 = 0.856 < 0.95
f × 0.9 = 180.0
1.1 × (1 − e1 × φ1)/φ1 = 106.5 > fb93
1.1 × (1 − e2 × φ2)/φ2 = 87.36 < fb126.62
X LOWER LIMIT VALUE
◯

As shown in Table 7, parameters in the first state (state 1) are set as below.

An inverse (1/Ø) of a refracting power Ø of the entire relay system is set to 200.0, an inverse (1/Ø11) of a reflective power of the first lens group 106-1 is set to 215.17, a paraxial inter-group distance e1 of the first lens group 106-1 and the second lens group 108-1 is set to 103.18, an inverse (1/Ø12) of a refracting power of the second lens group 108-1 is set to 1469.93, and a paraxial back-focus fb1 of the relay lens system receiving an infinite light flux is set to 93.00, respectively.

Similarly, parameters in the second state (state 2) are set as below.

An inverse (1/Ø) of a refracting power Ø of the entire relay system is set to 200.0, an inverse (1/Ø21) of a reflective power of the first lens group 106-2 is set to 342.47, a paraxial inter-group distance e2 of the first lens group 106-2 and the second lens group 108-2 is set to 120.58, an inverse (1/Ø22) of a refracting power of the second lens group 108-2 is set to 311.37, and a paraxial back-focus fb2 of the relay lens system receiving an infinite light flux is set to 126.6, respectively.

In the projection type display apparatus 100B in the third embodiment, wherein the parameters are set as shown in Table 7, "e1/e2" is 0.856, which is smaller than the lower limit value regulated by the condition formula (5), so that the condition formula (5) is not satisfied.

Also, the maximum value Fbmax of the back-focus fb is 180 (200×0.9), the minimum value Fbmin1 of the back-focus in the first state is 106.5 and the minimum value Fbmin2 of the back-focus in the second state is 87.36, which do not satisfy the range regulated by the condition formula (6).

Table 8 shows optical data in the first state of the second embodiment, and Table 9 shows optical data in the second state in the same way.

TABLE 8

| SURFACE | R | INTERVAL | REFRACTION INDEX | DISPERSION | INCLINATION | EFFECTIVE DIAMETER |
|---|---|---|---|---|---|---|
| 1 | ∞ | 83.60 | | | | 10.0 × 18.2 |
| 2 | 135.34 | 2.00 | 1.60311 | 60.7 | | φ70 |
| 3 | 85.61 | 5.80 | | | | φ70 |
| 4 | 205.25 | 15.00 | 1.63854 | 55.4 | | φ70 |
| 5 | −68.49 | 30.00 | | | | φ70 |
| 6 | ∞ | 3.50 | 1.472 | 65.65 | | 68.4 × 70.0 |
| 7 | −23.3 | 46.0 | | | | 3.8 × 5.0 |
| 8 | ∞ | 3.50 | 1.472 | 65.65 | | 68.4 × 70.0 |
| 9 | −23.3 | 40.00 | | | | 3.8 × 5.0 |
| 10 | 131.30 | 12.40 | 1.51633 | 64.1 | | φ74 |
| 11 | −144.80 | 0.80 | | | | φ74 |
| 12 | −132.30 | 2.50 | 1.80518 | 25.4 | | φ74 |
| 13 | −248.00 | 51.00 | | | | φ74 |
| 14 | ∞ | 49.00 | REFLECTION SURFACE | | 48.625 | |
| 15 | 360.00 | 7.40 | 1.51633 | 64.1 | | φ62 |
| 16 | 678.00 | 4.00 | | | | φ62 |
| 17 | ∞ | 27.84 | 1.51633 | 64.1 | | |
| 18 | ∞ | 35.46 | REFLECTION SURFACE | | 49.75 | |
| 19 | ∞ | 1.00 | | | 16.75 | |
| 20 | ∞ | 57.00 | 1.51633 | 64.1 | | |
| 21 | ∞ | 4.00 | | | | |
| 22 | ∞ | 3.00 | 1.51633 | 64.1 | | |
| 23 | ∞ | 0.50 | | | | 19.15 × 14.36 |

TABLE 9

| SURFACE | R | INTERVAL | REFRACTION INDEX | DISPERSION | INCLINATION | EFFECTIVE DIAMETER |
|---|---|---|---|---|---|---|
| 1 | ∞ | 83.60 | | | | 10.0 × 18.2 |
| 2 | 135.34 | 2.00 | 1.60311 | 60.7 | | φ70 |
| 3 | 85.61 | 5.80 | | | | φ70 |
| 4 | 205.25 | 15.00 | 1.63854 | 55.4 | | φ70 |
| 5 | −68.49 | 30.00 | | | | φ70 |
| 6 | ∞ | 3.50 | 1.472 | 65.65 | | 71 × 70.2 |
| 7 | −23.3 | 46.0 | | | | 7.1 × 3.9 |
| 8 | ∞ | 3.50 | 1.472 | 65.65 | | 71 × 70.2 |
| 9 | −23.3 | 40.00 | | | | 7.1 × 3.9 |
| 10 | 215.00 | 12.40 | 1.51633 | 64.1 | | φ70 |
| 11 | −164.60 | 0.80 | | | | φ70 |
| 12 | −147.70 | 2.50 | 1.80518 | 25.4 | | φ70 |
| 13 | −284.00 | 61.00 | | | | φ70 |
| 14 | ∞ | 49.00 | REFLECTION SURFACE | | 48.625 | |
| 15 | 300.00 | 7.40 | 1.51633 | 64.1 | | φ70 |
| 16 | −346.00 | 6.30 | | | | φ70 |
| 17 | ∞ | 35.2 | 1.51633 | 64.1 | | |
| 18 | ∞ | 46.2 | REFLECTION SURFACE | | 49.75 | |
| 19 | ∞ | 1.00 | | | 16.75 | |
| 20 | ∞ | 82.50 | 1.51633 | 6.41 | | |
| 21 | ∞ | 4.00 | | | | |
| 22 | ∞ | 3.00 | 1.51633 | 64.1 | | |
| 23 | ∞ | 0.50 | | | | 28.02 × 14.77 |

As explained above, the projection type display apparatus 100B of the third embodiment is an example of being in short of the lower limit value of the condition formula (5), and it is known that an interval between the first lens group 106 and the second lens group 108 is changed by 10 mm. In this case, a common case cannot be used.

Fourth Embodiment

As a fourth embodiment, a change of a value in the condition formula (6) when designing the relay lens system by keeping an interval between lens tops to be constant and changing the back-focus will be examined.

FIG. 12A to FIG. 12C are views of an optical path when changing a back focus while keeping an arrangement constant at a focal length of 200 mm. In FIG. 12A to FIG. 12C, bending by a mirror is omitted and a prism optical path is illustrated in air equivalent.

In this case, as shown in FIG. 12A, when the back-focus is made shorter with respect to the focal length, a refracting power of the second lens group 108 becomes weak and the refracting power leans to the first lens group 106. Since a refracting power gathers to the first lens group 106 being close to a stop, field curvature arises and rectangular boundary lines of an illumination area defocuses, which is not preferable.

Inversely, as shown in FIG. 12C, when the back-focus becomes close to the focal length, a refracting power gathers to the second lens group 108. In this case, since a refracting power of the first lens group 106 being close to the stop is weak, a spherical aberration arises, the illumination area boundary lines blur as a whole and the width becomes wide, which is not preferable. It is because a wider illumination area becomes necessary to secure an effective area in the case where the blur spreads wide comparing with that in the case where the boundary lines are sharp.

The power arrangements in FIG. 12A to FIG. 12C are shown in Table 10. Values of a back-focus condition formula are also shown.

In Table 10, "a" corresponds to FIG. 12A, "b" corresponds to FIG. 12B, and "c" corresponds to FIG. 12C.

As shown in Table 10, "a" and "c" do not satisfy the condition formula.

TABLE 10

|   | f | Fb | 1/φ1 | 1/φ2 | e | e1/e2 | (1 − φe)/φ × 1.1 | f × 0.9 |
|---|---|----|------|------|---|-------|-------------------|---------|
| a | 200.0 | 70  | 193.14  | −2427.83 | 109.705 | 0.93 | 99.32 | 180 |
| b | 200.0 | 130 | 362.18  | 297.75   | 117.89  | STANDARD | 90.32 | 180 |
| c | 200.0 | 190 | 1572.33 | 223.65   | 38.42   | 0.325 | 177.74 | 180 |

Table 11 shows optical data of the configuration in FIG. 12A. Table 12 shows optical data of the configuration in FIG. 12B and Table 13 shows optical data of the configuration in FIG. 12C in the same way.

TABLE 11

| SURFACE | R | INTERVAL | REFRACTION INDEX | DISPERSION | EFFECTIVE DIAMETER |
|---------|---|----------|------------------|------------|--------------------|
| STOP |          | 40.0   |         |       | φ68 |
| 1    | 120.1237 | 12.40  | 1.51633 | 64.1  | φ70 |
| 2    | −134.6766| 0.80   |         |       | φ70 |
| 3    | −122.3330| 2.50   | 1.80518 | 25.4  | φ70 |
| 4    | −220.8936| 110.00 |         |       | φ70 |
| 5    | −537.1323| 10.0   | 1.51633 | 64.1  | φ70 |
| 6    | −943.4605| 70.0   |         |       | φ70 |

TABLE 12

| SURFACE | R | INTERVAL | REFRACTION INDEX | DISPERSION | EFFECTIVE DIAMETER |
|---------|---|----------|------------------|------------|--------------------|
| STOP |          | 40.0   |         |       | φ68 |
| 1    | 261.2074 | 12.40  | 1.51633 | 64.1  | φ70 |
| 2    | −152.7759| 0.80   |         |       | φ70 |
| 3    | −135.5705| 2.50   | 1.80518 | 25.4  | φ70 |
| 4    | −240.6086| 110.00 |         |       | φ70 |
| 5    | 351.7050 | 10.0   | 1.51633 | 64.1  | φ70 |
| 6    | −271.7973| 130.0  |         |       | φ70 |

TABLE 13

| SURFACE | R | INTERVAL | REFRACTION INDEX | DISPERSION | EFFECTIVE DIAMETER |
|---------|---|----------|------------------|------------|--------------------|
| STOP |          | 40.0   |         |       | φ68 |
| 1    | −115.4936| 12.40  | 1.51633 | 64.1  | φ70 |
| 2    | −66.48371| 0.80   |         |       | φ70 |
| 3    | −62.76241| 2.50   | 1.80518 | 25.4  | φ70 |
| 4    | −81.62645| 110.00 |         |       | φ70 |
| 5    | 195.5611 | 10.0   | 1.51633 | 64.1  | φ70 |
| 6    | −279.3299| 190.00 |         |       | φ70 |

FIG. 13A and FIG. 13B are views of an aberration of a relay lens system corresponding to the configuration in FIG. 12A, wherein FIG. 13A shows the spherical aberration, and FIG. 12B shows field curvature.

FIG. 14A and FIG. 14B are views of an aberration of a relay lens system corresponding to the configuration in FIG. 12B, wherein FIG. 14A shows the spherical aberration, and FIG. 14B shows field curvature.

Figure 15A:
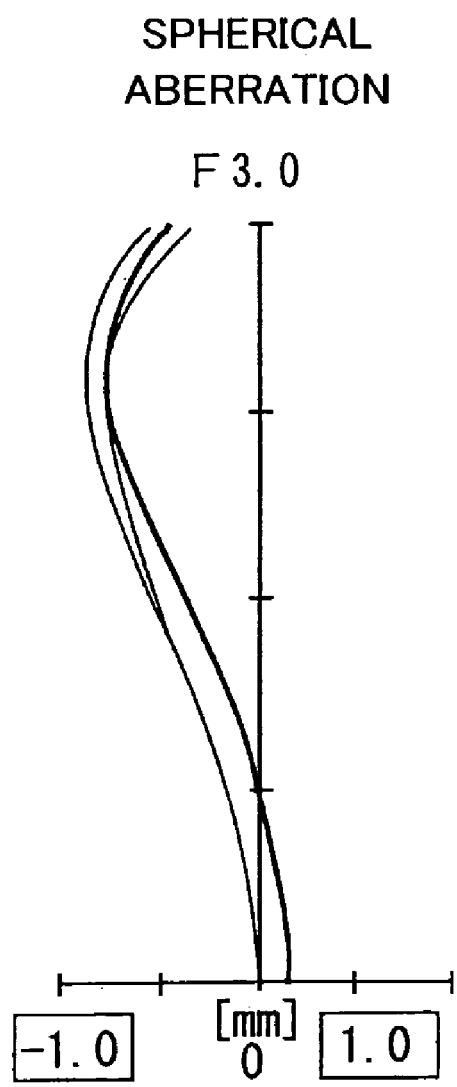
FIG. 15A and FIG. 15B are views of an aberration of a relay lens system corresponding to the configuration in FIG. 12C.
Figure 15B:
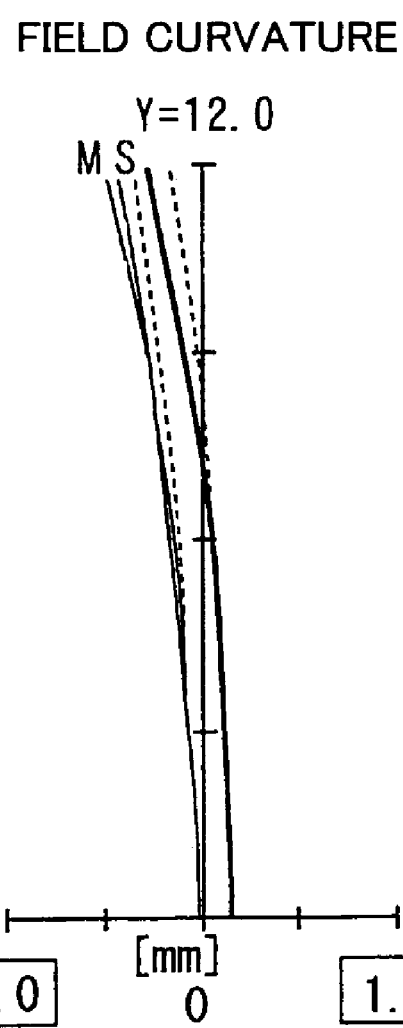
Figure 16:
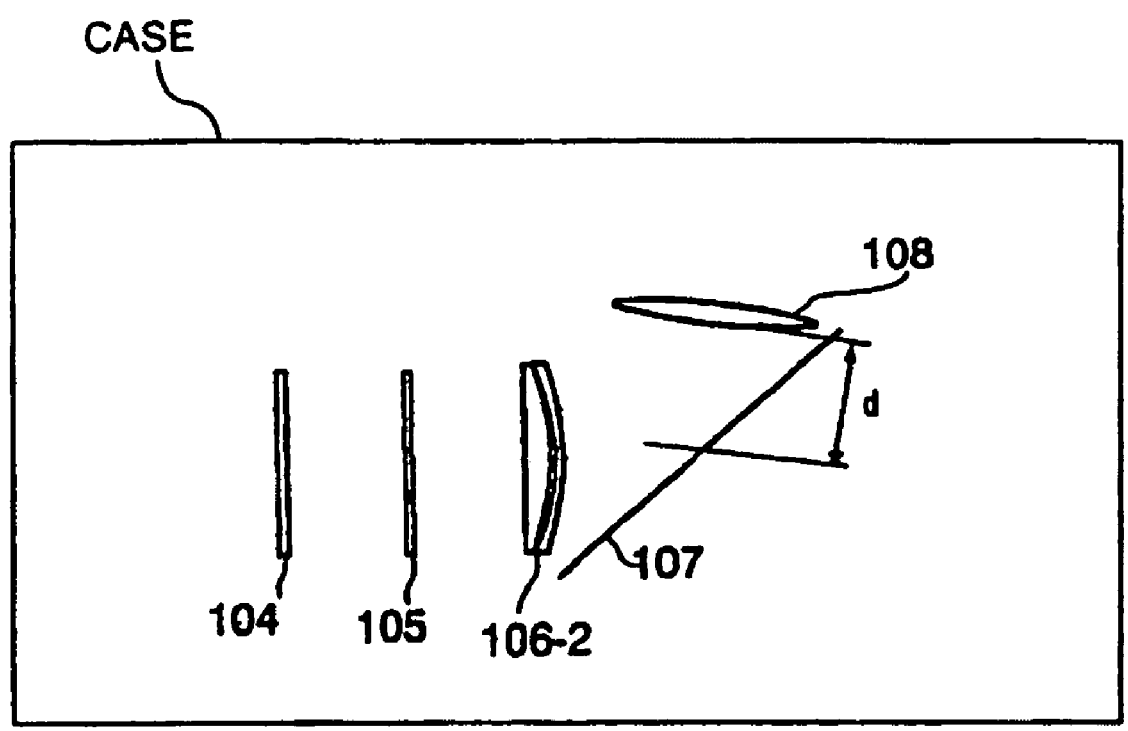
FIG. 16 depicts a case for an illumination optical system in accordance with the present invention.

FIG. 15A and FIG. 15B are views of an aberration of a relay lens system corresponding to the configuration in FIG. 12C, wherein FIG. 15A shows the spherical aberration, and FIG. 15B shows field curvature.

In the aberration views in FIG. 13 to FIG. 15, a position of the surface of the second fly-eye lens is set at an aperture stop and evaluated as an aberration receiving an infinite light flux. This corresponds to an evaluation of focusing performance on the first fly-eye lens surface when the first fly-eye lens 105 is arranged at a focal point on the light source side of the second fly-eye lens 106.

In the configuration in FIG. 12A and FIG. 12C, wherein the condition formula (6) is not satisfied, an aberration arises much.

Also from this view point, it is known that the condition formula (6) has to be satisfied.

As explained above, according to the present embodiment, as a result that the image display device 111 (-1 and -2), an illumination optical system for irradiating an illumination light from a light source to the image display device, and a projection optical system for projecting an image formed by the image display device are provided; the illumination optical system includes the first fly-eye lens 104 (-1 and -2) and the second fly-eye lens 105 (-1 and -2) arranged at each other's focal points, and the first lens group 106 (-1 and -2) and the second lens group 108 (-1 and -2) arranged over the mirror 107 (-1 and -2) for bending an optical path; and the first and second lens groups have a same focal length but different back-focus; and the condition formulas (1) to (6) are satisfied; it is possible to install lenses in a common case even when a size of the image display device and an optical path length of the prism are changed, and the development costs and the product cost can be reduced.

It should be understood by those skilled in the art that various modifications, combinations, sub-combinations and alternations may occur depending on design requirements and other factors insofar as they are within the scope of the appended claims or the equivalents thereof.

What is claimed is:

1. A projection type display apparatus, comprising:
a light source for emitting an illumination light,
an image display device,
an illumination optical system for irradiating the illumination light from said light source to said image display device, and
a projection optical system for projecting an image formed by said image display device;
wherein
said illumination optical system comprises
a first fly-eye lens and a second fly-eye lens arranged at each other's focal points,
a first lens group, and
a second lens group arranged over a mirror for bending an optical path and having a same focal length as that of said first lens group but a different back focus; and
wherein said illumination optical system is useable in both a predetermined first state and a second state satisfying condition formulas below.

$$e1=-(\emptyset-\emptyset11-\emptyset12)/(\emptyset11\times\emptyset12) \quad (1)$$

$$e2=-(\emptyset-\emptyset21-\emptyset22)/(\emptyset21\times\emptyset22) \quad (2)$$

$$\emptyset11=(1-fb1\times\emptyset)/e1 \quad (3)$$

$$\emptyset21=(1-fb2\times\emptyset)/e2 \quad (4)$$

$$0.95<e1/e2<1.05 \quad (5)$$

$$1.1\times(1-e1\times\emptyset)/\emptyset<fb<f\times0.9 \quad (6)$$

Here, $\emptyset$ indicates a refracting power of an entire relay lens system (inverse number of focal length f), $\emptyset11$ indicates a refracting power of a first lens group in the first state, $\emptyset12$ indicates a refracting power of the second lens group in the first state, $\emptyset21$ indicates a refracting power of the first lens group in the second state, $\emptyset22$ indicates a refracting power of the second lens group in the second state, e1 indicates a paraxial inter-group distance between the first lens group and the second lens group in the first state, e2 indicates a paraxial inter-group distance between the first lens group and the second lens group in the second state, fb1 indicates a paraxial back-focus of the relay lens system receiving an infinite light flux in the first state and fb2 indicates a paraxial back focus of the relay lens system receiving an infinite light flux in the second state, respectively.

2. A projection type display apparatus as set forth in claim 1, wherein said first fly-eye lens, second fly-eye lens, first lens group, said mirror and said second lens group are arranged in this order from said light source side along an optical path of the illumination light.

3. A projection type display apparatus as set forth in claim 2, wherein:
in said first and second states, said first fly-eye lens, second fly-eye lens, an incident surface of said first lens group, and said mirror are arranged in this order from the light source side on one optical axis being free of the influence of reflecting effects; and
a distance d1 from the mirror to the light incident surface of the second lens group in the first state and a distance d2 from the mirror to the light incident surface of the second lens group in the second state are set to be approximately equal.

4. A projection type display apparatus as set forth in any one of claims 1 to 3, wherein a prism is arranged on the illumination light emitting side of said second lens group.

5. A projection type display apparatus as set forth in claim 4, comprising a case for housing said illumination optical system; wherein said illumination optical system is arranged in a predetermined length direction of the case, and the illumination optical system in the first state and the illumination optical system in the second state are exchangeable.

6. A projection type display apparatus as set forth in claim 5, wherein: said first lens group and said second lens group form a relay lens system; and focal lengths of said first and second fly-eye lenses and said relay lens system are maintained to be constant.

* * * * *